US011520869B2

(12) United States Patent
Chen et al.

(10) Patent No.: US 11,520,869 B2
(45) Date of Patent: Dec. 6, 2022

(54) METHOD AND SYSTEM FOR TEMPORARY USE OF BIOMETRIC INFORMATION OF ANOTHER FOR ACCESS TO A SYSTEM

(71) Applicant: Konica Minolta Business Solutions U.S.A., Inc., Ramsey, NJ (US)

(72) Inventors: Yu-Shing Chen, Cupertino, CA (US); Kenneth Huang Young, San Mateo, CA (US); Randy Cruz Soriano, San Leandro, CA (US); Ann Qiongying Feng, San Jose, CA (US)

(73) Assignee: KONICA MINOLTA BUSINESS SOLUTIONS U.S.A., INC., Ramsey, NJ (US)

( * ) Notice: Subject to any disclaimer, the term of this patent is extended or adjusted under 35 U.S.C. 154(b) by 304 days.

(21) Appl. No.: 16/827,816

(22) Filed: Mar. 24, 2020

(65) Prior Publication Data
US 2021/0303665 A1    Sep. 30, 2021

(51) Int. Cl.
*G06F 21/32* (2013.01)
*H04L 9/32* (2006.01)
*G06F 21/33* (2013.01)
*G06F 21/44* (2013.01)
*G06F 21/40* (2013.01)

(52) U.S. Cl.
CPC .............. *G06F 21/32* (2013.01); *G06F 21/33* (2013.01); *G06F 21/40* (2013.01); *G06F 21/445* (2013.01); *H04L 9/3273* (2013.01)

(58) Field of Classification Search
CPC .......... G06F 21/32; G06F 21/33; G06F 21/40; G06F 21/445; H04L 9/321; H04L 9/3228; H04L 9/3231; H04L 9/3273
See application file for complete search history.

(56) References Cited

U.S. PATENT DOCUMENTS

| 7,216,803 | B2 | 5/2007 | Nwosu | |
| 9,032,498 | B1* | 5/2015 | Ben Ayed | G06F 21/35 726/9 |
| 10,305,895 | B2* | 5/2019 | Barry | G06V 40/172 |
| 2005/0268107 | A1* | 12/2005 | Harris | H04L 63/0853 713/182 |
| 2015/0140964 | A1* | 5/2015 | Horton | H04L 63/107 455/410 |
| 2015/0358316 | A1* | 12/2015 | Cronin | H04L 63/0861 726/6 |
| 2019/0332754 | A1* | 10/2019 | Andersen | G06F 21/35 |

\* cited by examiner

*Primary Examiner* — Theodore C Parsons
(74) *Attorney, Agent, or Firm* — Buchanan Ingersoll & Rooney PC

(57) ABSTRACT

A method and system for temporarily gaining access to a system is disclosed, The method includes: receiving biometric data from a first biometric device of a first user on a computer processor; generating a temporary code on the computer processor in response to receipt of the biometric data from the first biometric device of the first user; sending the temporary code from the computer processor to the first biometric device of the first user; receiving biometric data from a second biometric device of a second user on the first biometric device of the first user; generating an access code on the first biometric device, the access code including one or more of the biometric data of the first user, the temporary code from the computer processor, and the biometric data of the second user; and sending the access code to the biometric device of the second user.

20 Claims, 11 Drawing Sheets

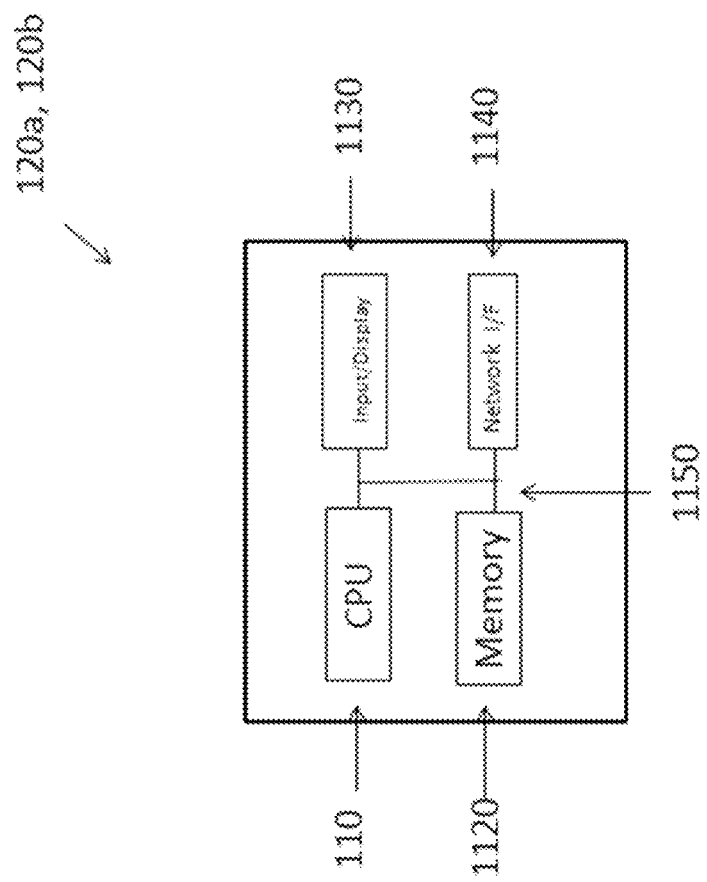

METHOD AND SYSTEM FOR TEMPORARY USE OF BIOMETRIC INFORMATION OF ANOTHER FOR ACCESS TO A SYSTEM

TECHNICAL FIELD

The present disclosure generally relates to a method and system for temporary use of biometric information of another for access to a system, and more particularly temporarily gaining access to a system using biometric data of plural users.

BACKGROUND

In today's use of biometrics to gain access into a system, there is a possibility that someone may not be available at the time that access into a system is needed. This may be due to the person being on vacation, sick, in a meeting, etc. Whatever the reason may be, this person may want to temporarily give permission to second person to access the System while he/she is unavailable. Providing such temporary permission may in itself, violate security measures for which the biometric device was originally intended to achieve.

SUMMARY

In consideration of the above issues, it would be desirable to provide a safe, and secure method to providing temporary access using a combination of biometric information, for example, for providing temporary access to a spouse, a colleague, and/or a supervisor.

In accordance with an aspect, a method is disclosed for temporarily gaining access to a system using biometric data of plural users, the method comprising: receiving biometric data from a first biometric device of a first user on a computer processor; generating a temporary code on the computer processor in response to receipt of the biometric data from the first biometric device of the first user; sending the temporary code from the computer processor to the first biometric device of the first user; receiving biometric data from a second biometric device of a second user on the first biometric device of the first user; generating an access code on the first biometric device, the access code including one or more of the biometric data of the first user, the temporary code from the computer processor, and the biometric data of the second user; sending the access code to the biometric device of the second user; and forwarding the access code from the biometric device of the second user to the computer processor for access to a computer system for the second user.

In accordance with another aspect, a non-transitory computer readable medium storing computer readable program code executed by a processor for temporarily gaining access to a system using biometric data of plural users is disclosed, the process comprising: receiving biometric data from a first biometric device of a first user on a computer processor; generating a temporary code on the computer processor in response to receipt of the biometric data from the first biometric device of the first user; sending the temporary code from the computer processor to the first biometric device of the first user; receiving biometric data from a second biometric device of a second user on the first biometric device of the first user; generating an access code on the first biometric device, the access code including one or more of the biometric data of the first user, the temporary code from the computer processor, and the biometric data of the second user; sending the access code to the biometric device of the second user; and forwarding the access code from the biometric device of the second user to the computer processor for access to a computer system for the second user.

In accordance with a further aspect, a system is disclosed for temporarily gaining access to a computer system using biometric data of plural users, the system comprising: a first biometric device of a first user; a second biometric device of a second user; a computer processor configured to: receive biometric data from the first biometric device of the first user; generate a temporary code on the computer processor in response to receipt of the biometric data from the first biometric device of the first user; send the temporary code from the computer processor to the first biometric device of the first user; the first biometric device configured to: receive biometric data from a second biometric device of a second user on the first biometric device of the first user; generate an access code on the first biometric device, the access code including one or more of the biometric data of the first user, the temporary code from the computer processor, and the biometric data of the second user; and send the access code to the biometric device of the second user; and the second biometric device configured to: forward the access code to the computer processor for access to a computer system for the second user.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 11 is an illustration of a biometric device in accordance with an exemplary embodiment.

DETAILED DESCRIPTION

Figure 1:
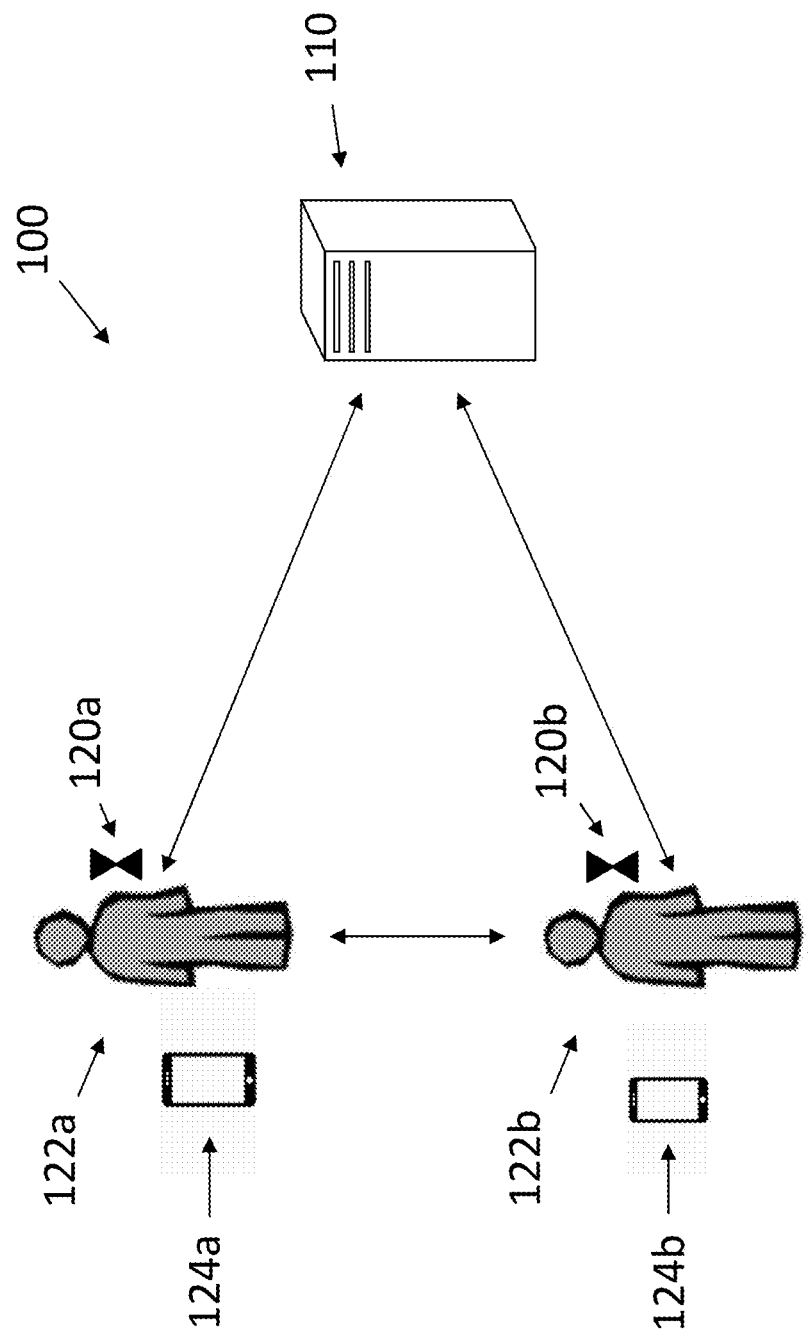
FIG. 1 is an illustration of a system for temporary use of biometric information of another to gain access to a computer system, which can include two or more biometric devices and the computer system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 for temporary use of biometric information of another to gain access to a computer system 110. As shown in FIG. 1, the system 100 can include a computer system 110 and two or more biometric devices 120a, 120b in accordance with an exemplary embodiment. In accordance with an exemplary embodiment, it would be desirable to have a method and system in which, for example, temporary access to the computer system 110 of a first user (User 1) 122a can be transferred to a second user (User 2) 122b that does not have authorization and/or access into the computer system 110. For example, the authorization or access into the computer system 110 can be in the form of logging into a personal computer of the first user 122a, entering a secure lab environment, entering a building, logging into an online account of the first user 122a, a guard tour patrol system for a temporary security guard, authorizing a payment, for example, Apple Pay, authenticate a ticket or voucher, and/or authorize a charge, for example, with Uber, Lyft, and/or DoorDash®. In accordance with an exemplary embodiment, the computer system 110, can be the actual hardware and/or software associated with a computer, badge readers, Iris scanners, fingerprint readers or any device that will read biometric information to gain access. For example, these devices may have back-end server software that can perform the actual processing of biometric data. The reading/scanning device together with the back-end server software can be defined as the computer system 110.

In accordance with an exemplary embodiment, the system and method as disclosed can allow access into the computer system 110 when a first user 122a with permissions (i.e., authorization and/or access) is not physically available. For example, the system and method as disclosed can allow access to a second user 122b into the computer system 110 through the use of the biometric information of another, for example, the first user 122a. For purposes of this description, the user's involved with this discussion can include, for example, a first user 122a (i.e., "Bob"), who has access to the computer system 110 through the use of a biometric device 120a of the first user 122a (i.e., "Bob"), and a second user 122b (i.e., "Joe") whom the first user 122a (i.e., Bob) wants to pass his biometric data so that the second user 122b (i.e., Joe) can access the computer system 110 in which the first user 122a (i.e., Bob) has access. In accordance with an exemplary embodiment, the second user 122b (i.e., Joe) also has a biometric device 120b, however, the biometric device 120b does not alloy the second user 122b access into the computer system 110.

In accordance with an exemplary embodiment, the computer system 110 can be, for example, a computer, a card reader, a software application, a database, and/or a file. For example, the computer system 110 can be any system that requires a user to be authenticated before allowing access. As disclosed herein, the biometric data of the first user 122a (i.e., Bob) can be, for example, "123456", and wherein the first user 122a is a valid user (i.e., authorized user) in the computer system 110. The biometric data of the second user 122b (i.e., Joe) can be, for example, "ABCDEF", and wherein second user 122b is NOT a valid user (i.e., not an authorized user) in the computer system 110. In accordance with an exemplary embodiment, "XXX" can be a temporary code generated by the computer system when a request is made as disclosed herein.

In accordance with an exemplary embodiment, the first biometric device 120a of the first user 122a and/or the second biometric device 120b of the second user 122b of the one or more of the users 122a, 122b may communicate with a client 124a, 124b, for example, a mobile client, tablet, or personal computer, when Bluetooth or Near Field Communication (NFC) or other protocols are available to transfer and/or receive the biometric data, access codes and/or temporary codes as disclosed herein. For example, the client 124a, 124b may include a display unit or graphical user interface, which can access, for example, a web browser in the memory of the mobile client (or mobile device). The mobile client (or mobile device) also includes the operating system (OS), which manages the computer hardware and provides common services for efficient execution of various software programs.

Figure 2:
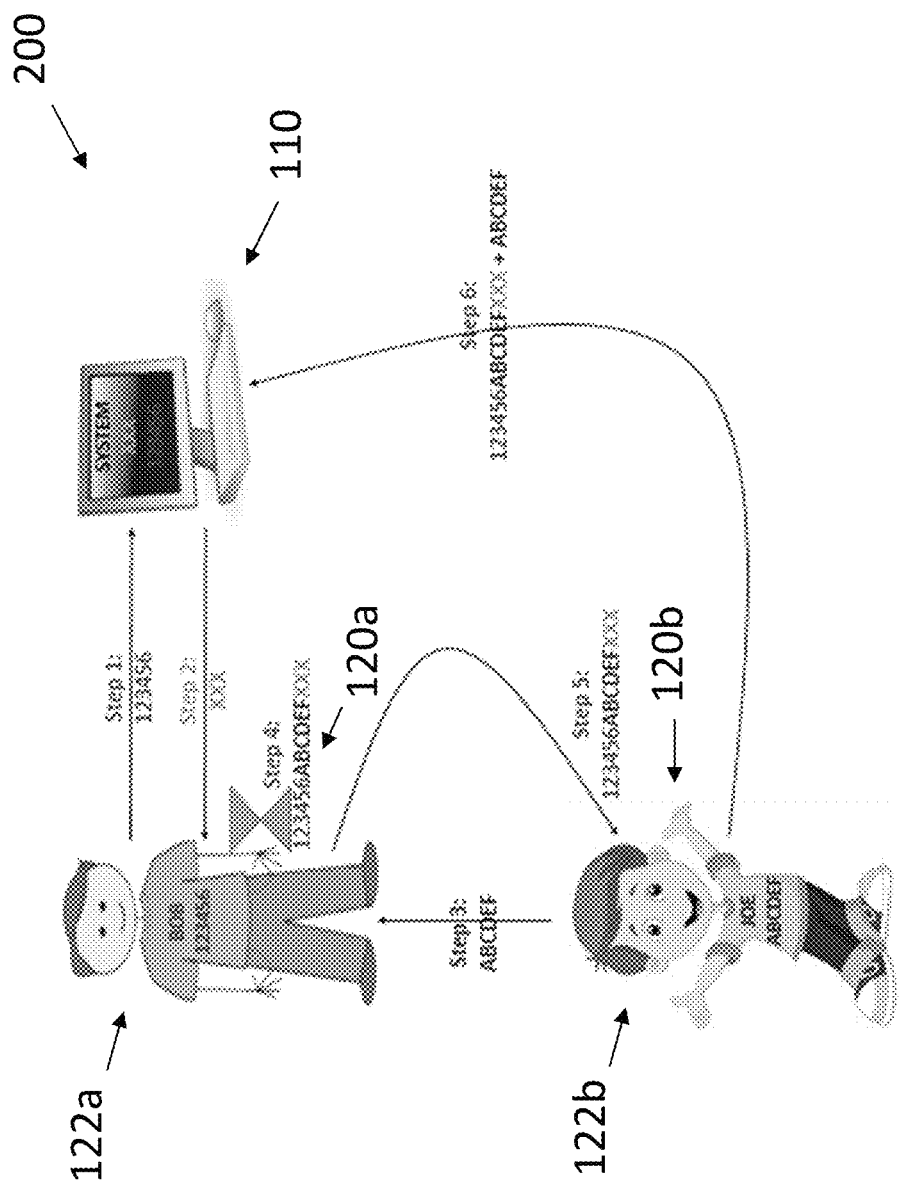
FIG. 2 is an illustration of system for temporary use of biometric information of another to gain access to a computer system in accordance with a first embodiment.

FIG. 2 is an illustration of system 200 for temporary use of biometric information of another to gain access to a computer system 100 in accordance with a first embodiment. As shown in FIG. 2, in step 1, the first user (i.e., user 1 or Bob) 122a logs into the computer system 110 by authenticating himself using his biometric device 120a as disclosed herein. In step 2, the computer system 110 sends a temporary code (i.e., XXX) to the biometric device 120a of the first user 122a (Bob's). In step 3, a second user 122b (i.e., Joe) wishing to access the computer system 110, and wherein the second user 122b (i.e., Joe) does not have access to the computer system 110, sends his biometric data ABCDEF from his biometric device 120b to the biometric device of the first user 112a (Bob) using, for example, Bluetooth, Near Field Communication (NFC) or any other communication protocol.

In accordance with an exemplary embodiment, the biometric data (or biometric identifiers) are preferably communicated from the biometric device 120a, 120b, using a secure protocol that communicates directly with the biometric device 120a, 120b of another user. However, if the users 122a, 122b, are not in a same location in which the biometric data can be communicated from one biometric device 120a, 120b to another biometric device 120a, 120b, the biometric data can be transferred using other secure protocols or communication networks, for example, a telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, in step 4, the biometric device 122a of the first user 122a (Bob) generates a unique code which is a combination of Bob's biometric data 123456+Joe's biometric data ABCDEF+the computer system's temporary code XXX. Thus, in step 4, the biometric device 120a of the first user 122a (i.e., Bob's device) creates a new code 123456ABCDEFXXX. In step 5, the biometric device 120a (i.e., Bob's device) of the first user 122a sends the generated code 123456ABCDEFXXX to the biometric device 122b of the second user 122b (i.e., Joe).

In step 6, the second user 122b (i.e., Joe) logs into the computer system 110 using an access code, which is a combination of the biometric data ABCDEF of the second user 122b and the new code provided by the biometric device 120a of the first user 122a (Bob) 123456ABCDEFXXX. Upon receiving the two codes ABCDEF and 123456ABCDEFXXX, the computer system 110 will validate the new code 123456ABCDEFXXX, for example, by the following method: confirm that the first user 122a (Bob) is a valid user by the biometric data of the first user 122a (i.e., Bob's biometric data 123456ABCDEFXXX), and validate the second user 122b (i.e. Joe's data from his biometric device ABCDEF matches the same code found in 123456ABCDEFXXX, which confirms that the second user's 122b biometric data (i.e., Joe's biometric data) is one that the biometric device 120a of the first user 122a (i.e., Bob's device) knows about since it was sent to the first user 122a (Bob) in Step 3. The computer system 110 validates the temporary code XXX generated by the computer system 110 by confirming the temporary code XXX matches (i.e., the temporary code is found in the access code (i.e., 123456ABCDEFXXX) provided by the second user 122b. In accordance with an exemplary embodiment, based on the above-mentioned checks or matches (i.e., three checks), the compute system 110 will allow the second user 122b (i.e., Joe) temporary access to the computer system 110.

Figure 3:
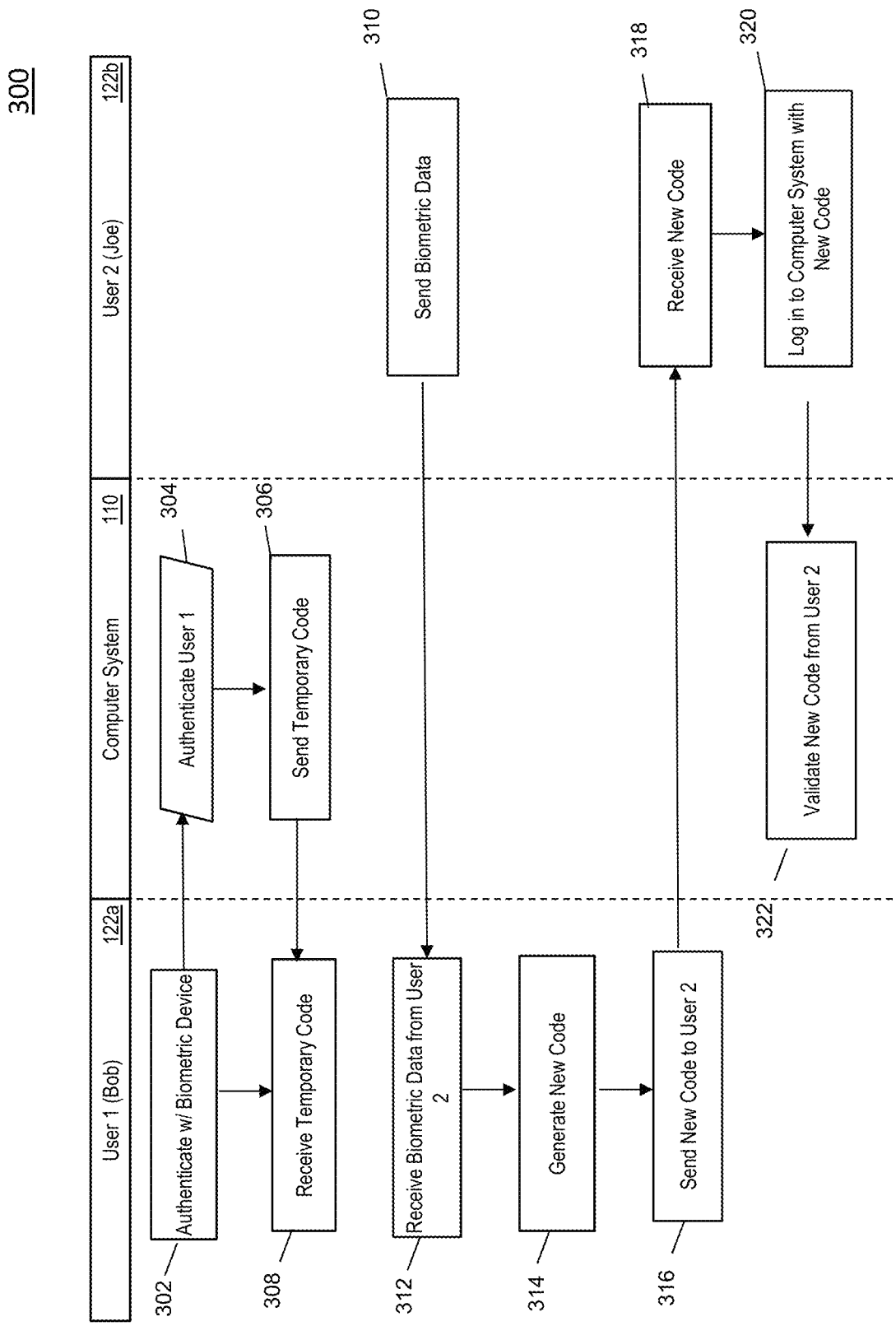
FIG. 3 is a flow chart illustrating the method for temporary use of biometric information to gain access to the computer system in accordance with the first embodiment.

FIG. 3 is a flow chart 300 illustrating the method for temporary use of biometric information to gain access to the computer system in accordance with the first embodiment. As shown in FIG. 3, in step 302, the first user 122a (User 1) is authenticated on a first biometric device 120a and the biometric data of the first user 122a is sent to the computer system 110. In step 304, the computer system 110 confirms authenticates the first user 122a and his/her biometric data. In step 306, the computer system 110 generates and sends a temporary code to the biometric device 120a of the first user 122a, which is received by the biometric device 120a of the first user 122a. In step 310, the second user 122b (User 2) is authenticated on a second biometric device 120b and the biometric data of the second user 122b is sent to the first biometric device 120a of the first user 122. In step 312, the biometric data of the second user 122b is received on biometric device 120a of the first user 122a. In step 314, the biometric device 120a of the first user generates a new code as disclosed herein and in step 316, the biometric device 120a of the first user 122a sends the new code to the biometric device 120b of the second user 122b, which is received in step 318 by the second biometric device 120b of the second user 122b. In step 320, the second user 122b using the second biometric device 120b logs into the computer system 110 using the new code received from the first biometric device 120a of the first user 122a. In step 322, the computer system 110 validates the new code and authorizes the second user 122b access to the computer system 110 under the authorization of the first user 112a.

Figure 4:
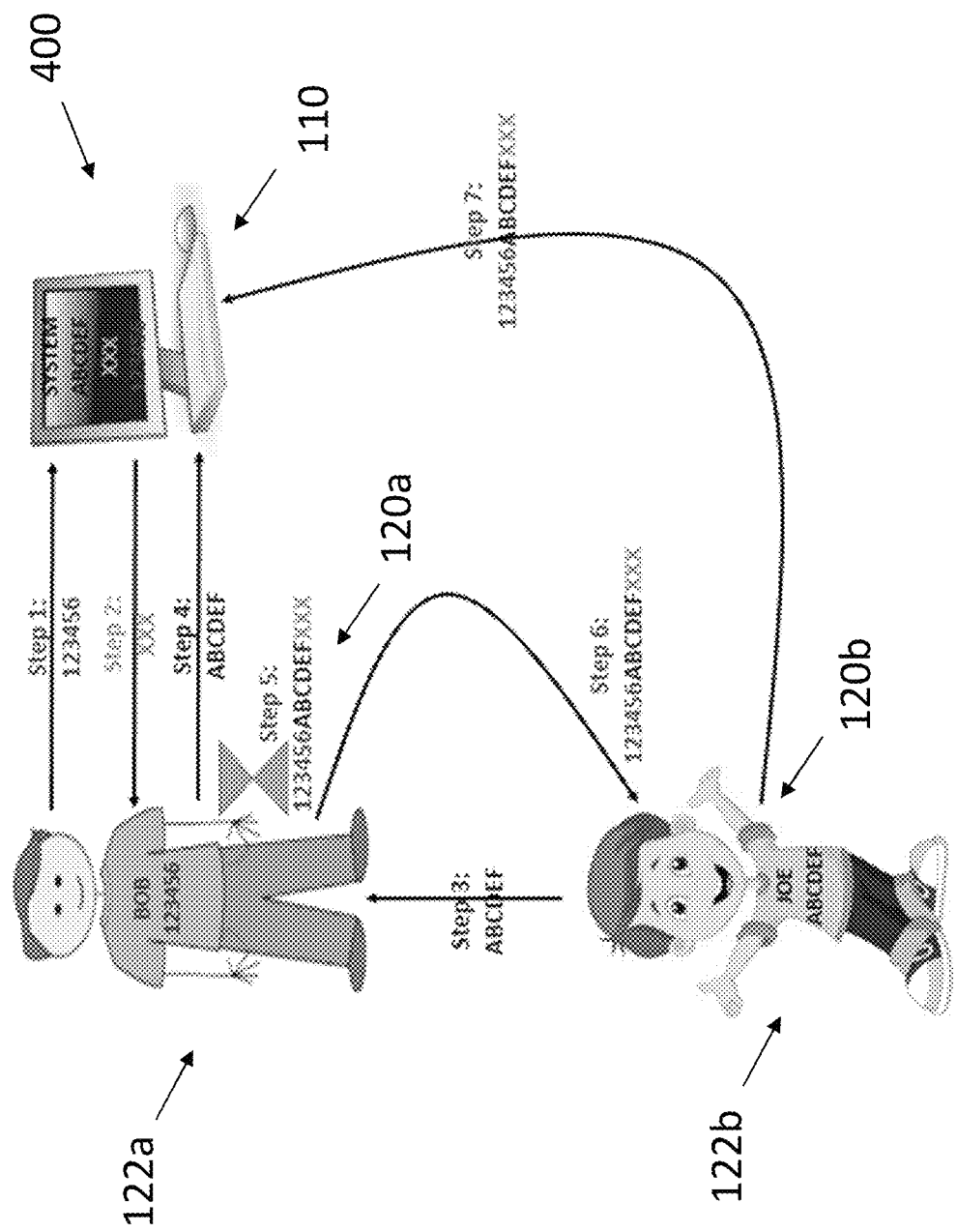
FIG. 4 is an illustration of system for temporary use of biometric information of another to gain access to a computer system in accordance with a second embodiment.

FIG. 4 is an illustration of system 400 for temporary use of biometric information of another to gain access to a computer system 110 in accordance with a second embodiment. As shown in FIG. 4, in step 1, the first user (i.e., user 1 or Bob) 122a logs into the computer system 110 by authenticating himself using his biometric device 120a as disclosed herein. In step 2, the computer system 110 sends a temporary code (i.e., XXX) to the biometric device 120a of the first user 122a (Bob's). In step 3, a second user 122b (i.e., Joe) wishing to access the computer system 110, and wherein the second user 122b (i.e., Joe) does not have access to the computer system 110, sends his biometric data ABCDEF from his biometric device 120b to the biometric device of the first user 112a (Bob) using, for example, Bluetooth, Near Field Communication (NFC) or any other communication protocol.

As set forth above, the biometric data (or biometric identifiers) are preferably communicated from the biometric device 120a, 120b, using a secure protocol that communicates directly with the biometric device 120a, 120b of another user. However, if the users 122a, 122b, are not in a same location in which the biometric data can be communicated from one biometric device 120a, 120b to another biometric device 120a, 120b, the biometric data can be transferred using other secure protocols or communication networks, for example, a telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, in step 4, the biometric device 122a of the first user 122a (Bob) sends the biometric data ABCDEF of second user 122b (i.e., Joe) to the computer system. In step 5, the biometric device 122a of the first user 122a (Bob) generates a unique code which is a combination of Bob's biometric data 123456 plus (+) Joe's biometric data ABCDEF plus (+) the computer system's temporary code XXX. Thus, in step 5, the biometric device 120a of the first user 122a (i.e., Bob's device) creates a new code 123456ABCDEFXXX. In step 6, the biometric device 120a (i.e., Bob's device) of the first user 122a sends the generated code 123456ABCDEFXXX to the biometric device 122b of the second user 122b (i.e., Joe).

In step 7, the second user 122b (i.e., Joe) logs into the computer system 110 using the new code (i.e., access code) provided by the first user 122a (Bob) 123456ABCDEFXXX. Upon receiving the code 123456ABCDEFXXX from the second user 122b (Joe), the computer system 110 will validate the new code 123456ABCDEFXXX by the following method: confirm that the first user 122a (Bob) is a valid user by the biometric data of the first user 122a (Bob's biometric data 123456ABCDEFXXX), and validate that the access code provided (123456ABCDEFXXX) matches the same code sent by the biometric device 120a of the first user 122a (Bob) to the computer system 110 in Step 4, which confirms that the biometric data of the second user 122b (i.e., Joe's biometric data) is one that the biometric device 120a of the first user 122a (i.e., Bob's device) knows about. In addition, the computer system 110 will validate that the temporary code XXX generated by the computer system 110 send in step 2 can be found or is included (i.e., matches) in the access code provided by the second user 122b (i.e., found is the access code, 123456ABCDEFXXX).

Figure 5:
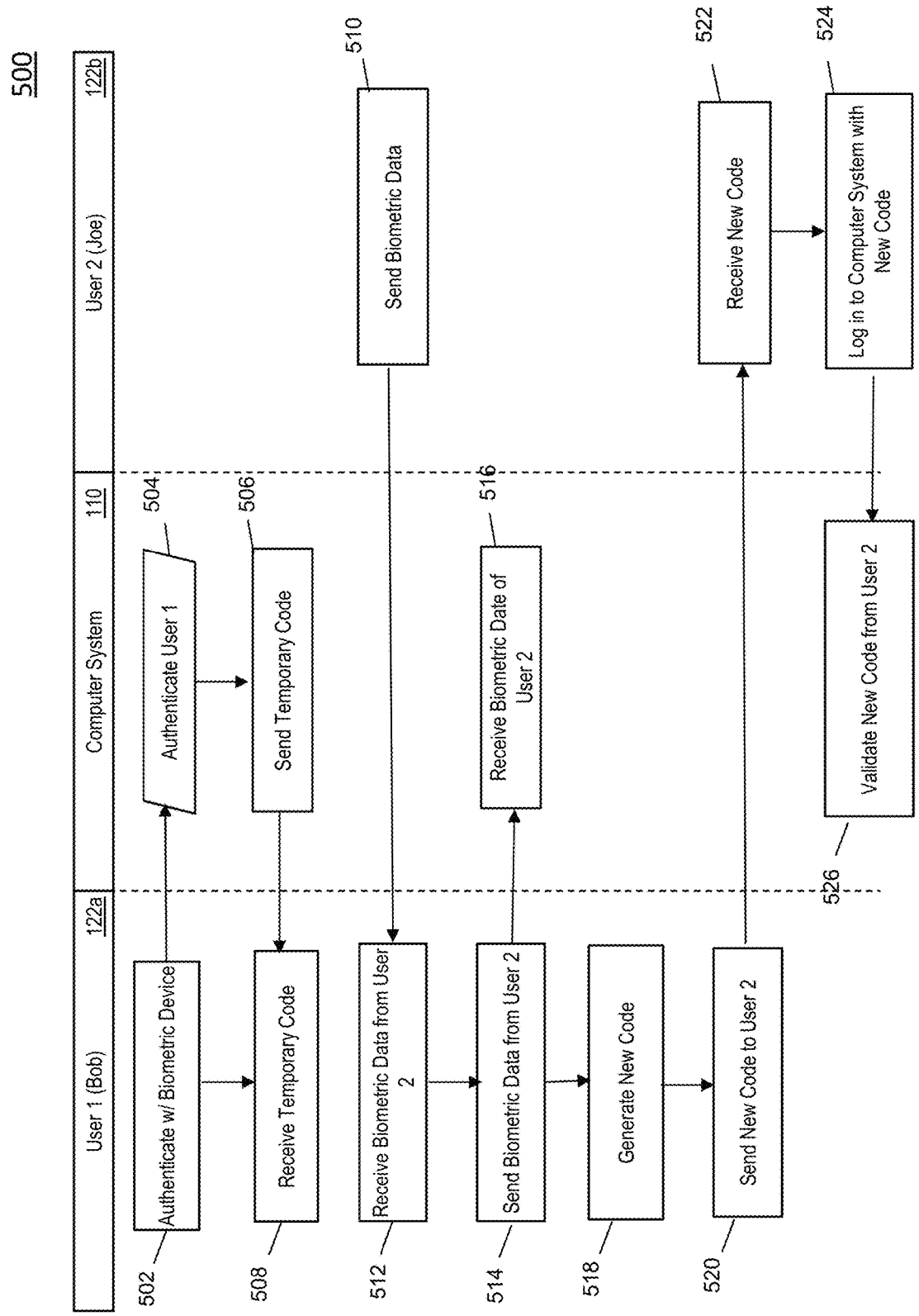
FIG. 5 is a flow chart illustrating the method for temporary use of biometric information to gain access to the computer system in accordance with the second embodiment.

FIG. 5 is a flow chart 500 illustrating the method for temporary use of biometric information to gain access to the computer system in accordance with the second embodiment. As shown in FIG. 5, in step 502, the first user 122a (User 1) is authenticated on a first biometric device 120a and the biometric data of the first user 122a is sent to the computer system 110. In step 504, the computer system 110 confirms authenticates the first user 122a and his/her biometric data. In step 506, the computer system 110 generates and sends a temporary code to the biometric device 120a of the first user 122a, which is received by the biometric device 120a of the first user 122a. In step 510, the second user 122b (User 2) is authenticated on a second biometric device 120b and the biometric data of the second user 122b is sent to the first biometric device 120a of the first user 122. In step 512, the biometric data of the second user 122b is received on biometric device 120a of the first user 122a. In step 514, the biometric device 120a of the first user 122a sends the biometric data of the second user 122b to the computer system 110. In step 516, the computer system 110 receives the biometric data of the second user 112b. In step 518, the biometric device 120a of the first user generates a new code as disclosed herein and in step 520, the biometric device 120a of the first user 122a sends the new code to the biometric device 120b of the second user 122b, which is received in step 522 by the second biometric device 120b of the second user 122b. In step 524, the second user 122b using the second biometric device 120b logs into the computer system 110 using the new code received from the first biometric device 120a of the first user 122a. In step 526, the computer system 110 validates the new code and authorizes the second user 122b access to the computer system 110 under the authorization of the first user 112a.

Figure 6:
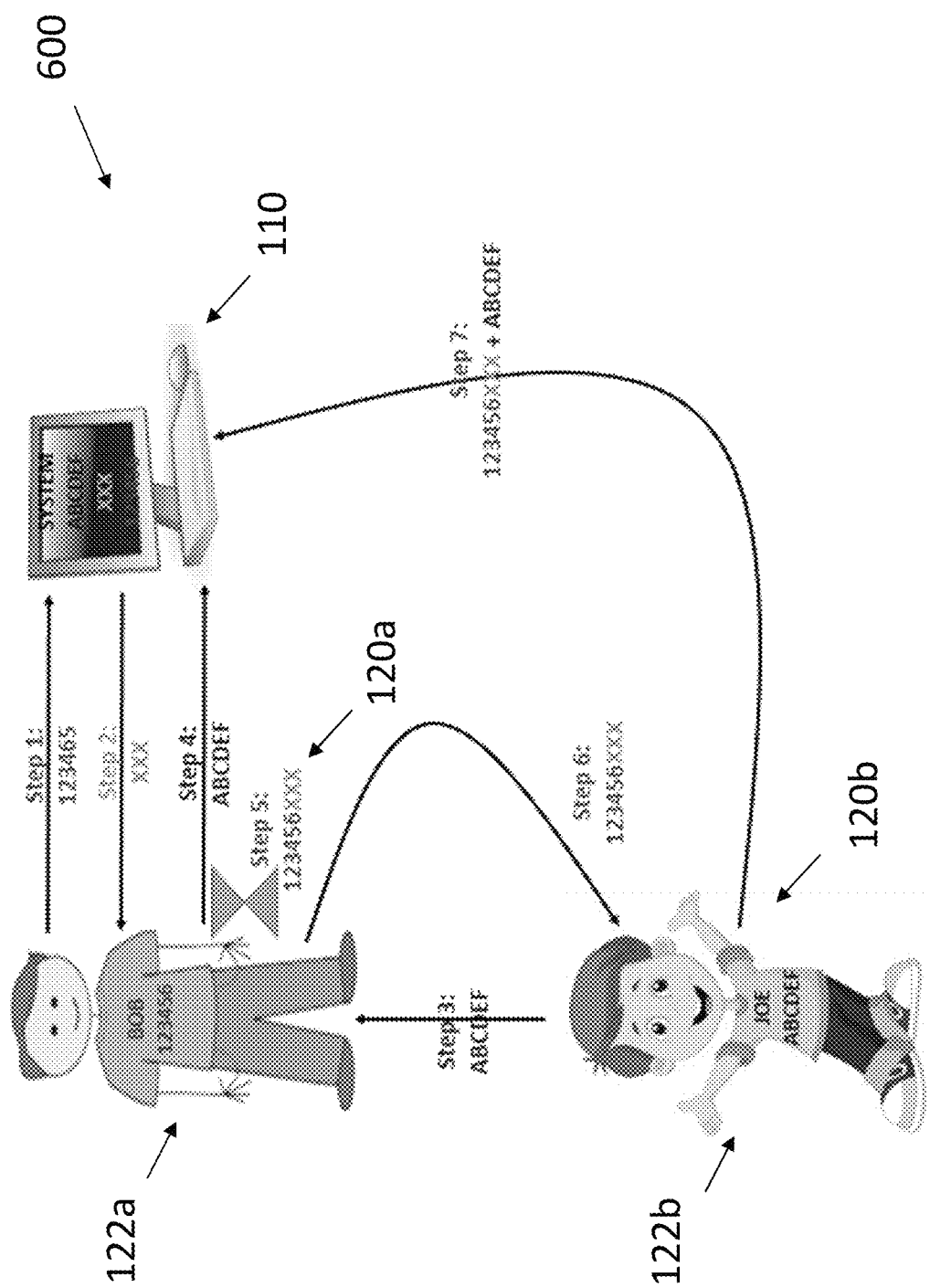
FIG. 6 is an illustration of system for temporary use of biometric information of another to gain access to a computer system in accordance with a third embodiment.

FIG. 6 is an illustration of system for temporary use of biometric information of another to gain access to a computer system in accordance with a third embodiment. As shown in FIG. 6, in step 1, the first user (i.e., user 1 or Bob) 122a logs into the computer system 110 by authenticating himself using his biometric device 120a as disclosed herein. In step 2, the computer system 110 sends a temporary code (i.e., XXX) to the biometric device 120a of the first user 122a (Bob's). In step 3, a second user 122b (i.e., Joe) wishing to access the computer system 110, and wherein the second user 122b (i.e., Joe) does not have access to the computer system 110, sends his biometric data ABCDEF from his biometric device 120b to the biometric device of the first user 112a (Bob) using, for example, Bluetooth, Near Field Communication (NFC) or any other communication protocol.

As set forth herein, the biometric data (or biometric identifiers) are preferably communicated from the biometric device 120a, 120b, using a secure protocol that communicates directly to the biometric device 120a, 120b of another user. However, if the users 122a, 122b, are not in a same location in which the biometric data can be communicated from one biometric device 120a, 120b to another biometric device 120a, 120b, the biometric data can be transferred using other secure protocols or communication networks, for example, a telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, in step 4, the biometric device 122a of the first user 122a (Bob) sends the biometric data ABCDEF of second user 122b (i.e., Joe) to the computer system 110. In step 5, the biometric device 122a of the first user 122a (Bob) generates a unique code which is a combination of Bob's biometric data 123456+the computer system's temporary code XXX. Thus, in step 5, the biometric device 120a of the first user 122a (i.e., Bob's device) creates a new code 123456XXX. In step 6, the biometric device 120a (i.e., Bob's device) of the first user 122a sends the generated code 123456XXX to the biometric device 122b of the second user 122b (i.e., Joe). In step 7, the second user 122b (i.e., Joe) logs into the computer system 110 using an access code comprising the new code (i.e., access code) provided by the first user 122a (Bob) 123456XXX plus the biometric data ABCDEF of the second user 122b (Joe). Upon receiving the code 123456XXX and the biometric data ABCDEF from the second user 122b (Joe), the computer system 110 will validate the new code 123456XXX and the biometric data of the second user 122b (Joe) will confirm that the biometric data of the second user 122b (i.e., Joe's biometric data ABCDEF from Step 7) is the same as what the computer system 110 had received in Step 4 from the biometric device 120a of the first user 122a (Bob). The computer system 110 will also check the biometric data of the first user 122a (Bob) matches what the computer system 110 already knows and the computer system 110 will confirm that the access code includes the temporary code XXX provided to the biometric device 120a of the first user 122a (Bob) in step 2, i.e., does the biometric device 120b of the second user 122b (Joe) know the temporary code XXX.

Figure 7:
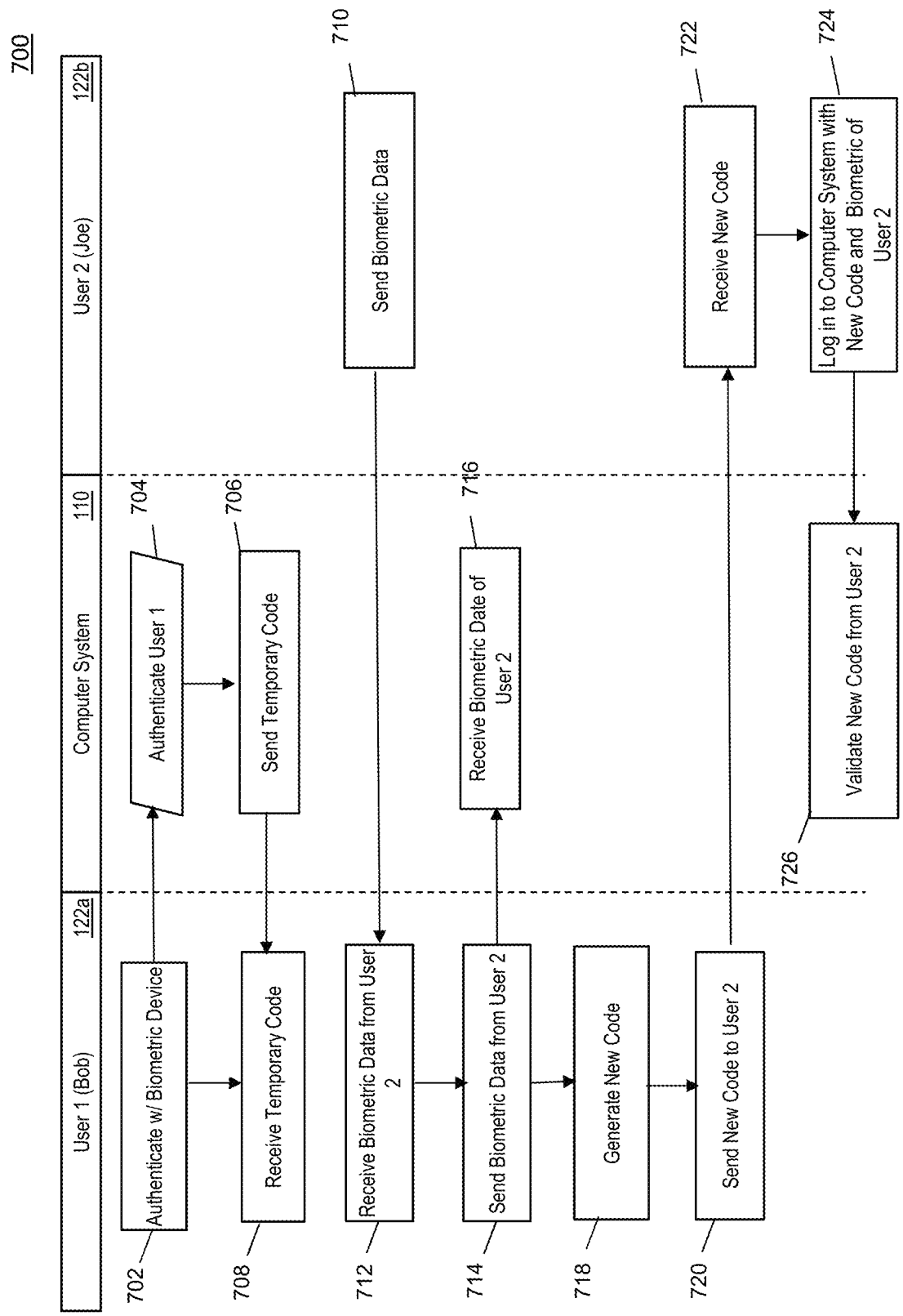
FIG. 7 is a flow chart illustrating the method for temporary use of biometric information to gain access to the computer system in accordance with the third embodiment.

FIG. 7 is a flow chart 700 illustrating the method for temporary use of biometric information to gain access to the computer system in accordance with the third embodiment. As shown in FIG. 7, in step 702, the first user 122a (User 1) is authenticated on a first biometric device 120a and the biometric data of the first user 122a is sent to the computer system 110. In step 704, the computer system 110 confirms authenticates the first user 122a and his/her biometric data. In step 706, the computer system 110 generates and sends a temporary code to the biometric device 120a of the first user 122a, which is received by the biometric device 120a of the first user 122a. In step 710, the second user 122b (User 2) is authenticated on a second biometric device 120b and the biometric data of the second user 122b is sent to the first biometric device 120a of the first user 122. In step 712, the biometric data of the second user 122b is received on biometric device 120a of the first user 122a. In step 714, the biometric device 120a of the first user 122a sends the biometric data of the second user 122b to the computer system 110. In step 716, the computer system 110 receives the biometric data of the second user 112b. In step 718, the biometric device 120a of the first user generates a new code as disclosed herein and in step 720, the biometric device 120a of the first user 122a sends the new code to the biometric device 120b of the second user 122b, which is received in step 722 by the second biometric device 120b of the second user 122b. In step 724, the second user 122b using the second biometric device 120b logs into the computer system 110 using the new code received from the first biometric device 120a of the first user 122a and the biometric data of the second user 122b detected by the biometric device 120b of the second user 122b. In step 726, the computer system 110 validates the new code and biometric data of the second user 122b and authorizes the second user 122b access to the computer system 110 under the authorization of the first user 112a.

Figure 8:
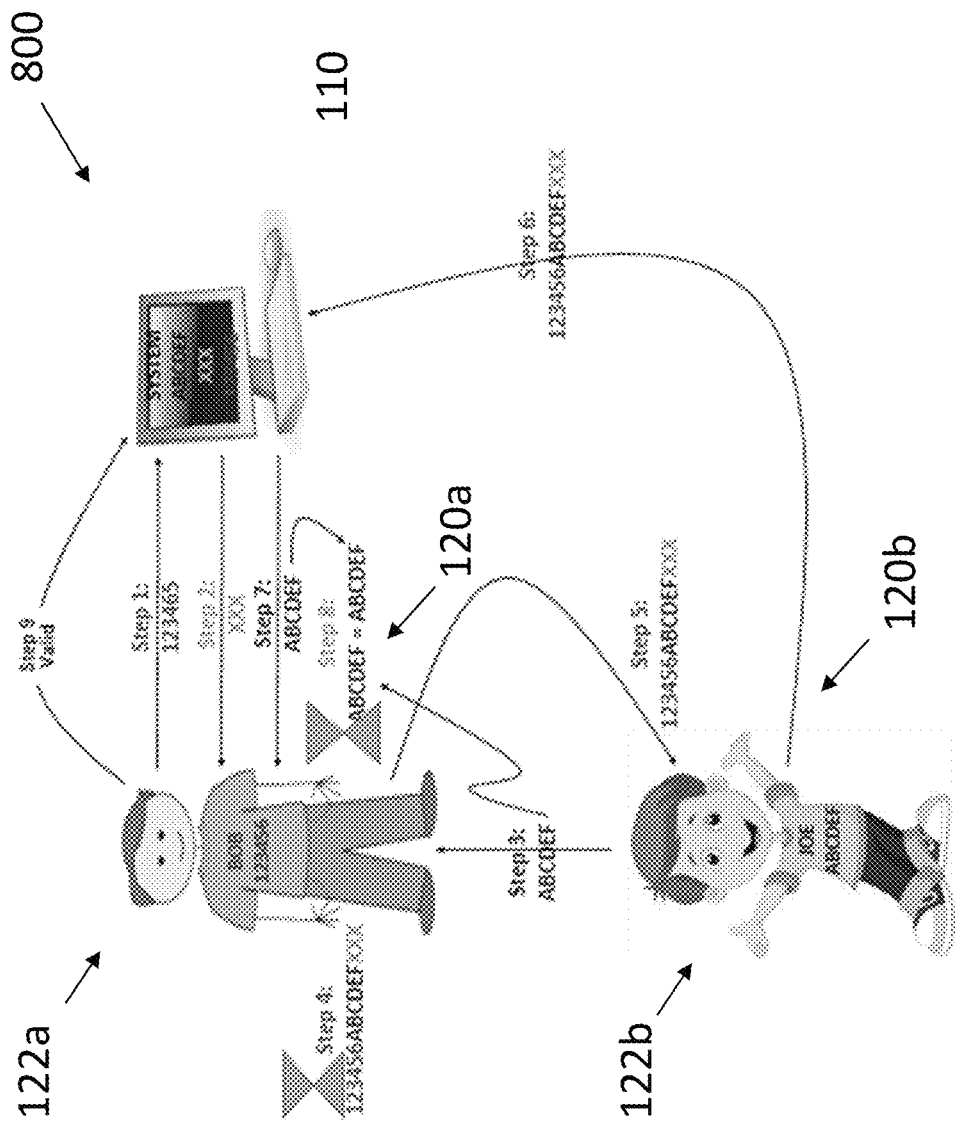
FIG. 8 is an illustration of system for temporary use of biometric information of another to gain access to a computer system in accordance with a fourth embodiment.

FIG. 8 is an illustration of system 800 for temporary use of biometric information of another to gain access to a computer system in accordance with a fourth embodiment. As shown in FIG. 8, in step 1, the first user (i.e., user 1 or Bob) 122a logs into the computer system 110 by authenticating himself using his biometric device 120a as disclosed herein. In step 2, the computer system 110 sends a temporary code (i.e., XXX) to the biometric device 120a of the first user 122a (Bob's). In step 3, a second user 122b (i.e., Joe) wishing to access the computer system 110, and wherein the second user 122b (i.e., Joe) does not have access to the computer system 110, sends his biometric data ABCDEF from his biometric device 120b to the biometric device of the first user 112a (Bob) using, for example, Bluetooth, Near Field Communication (NFC) or any other communication protocol.

As set forth above, the biometric data (or biometric identifiers) are preferably communicated from the biometric device 120a, 120b, using a secure protocol that communicates directly with the biometric device 120a, 120b of another user. However, if the users 122a, 122b, are not in a same location in which the biometric data can be communicated from one biometric device 120a, 120b to another biometric device 120a, 120b, the biometric data can be transferred using other secure protocols or communication networks, for example, a telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, in step 4, the biometric device 122a of the first user 122a (Bob) sends the biometric data ABCDEF of second user 122b (i.e., Joe) to the computer system. In step 4, the biometric device 122a of the first user 122a (Bob) generates a unique code which is a combination of Bob's biometric data 123456 plus (+) Joe's biometric data ABCDEF plus (+) the computer system's 110 temporary code XXX. Thus, in step 4, the biometric device 120a of the first user 122a (i.e., Bob's device) creates a new code 123456ABCDEFXXX. In step 5, the biometric device 120a (i.e., Bob's device) of the first user 122a sends the generated code 123456ABCDEFXXX to the biometric device 122b of the second user 122b (i.e., Joe). In step 6, the biometric device 120b of the second user 122b send the generated code 123456ABCDEFXXX received from the biometric device 120a of the first user 122a to the computer system 110. In step 7, the computer system 110 sends the biometric data of the second user 122b (Joe) ABCDEF from what the second user 122b (Joe) provided in Step 6, 123456ABCDEFXXX. In step 8, the biometric device 120a of the first user (Bob) compares the biometric data ABCDEF of the second user 122b received in step 3 with the biometric data ABCDEF received from the computer system in step 7. If the biometric data ABCDEF received in step 7 matches the biometric data received in step 3 from the second user 122b, the biometric device 120a of the first user 122a will validate the second user 122b in step 9.

Figure 9:
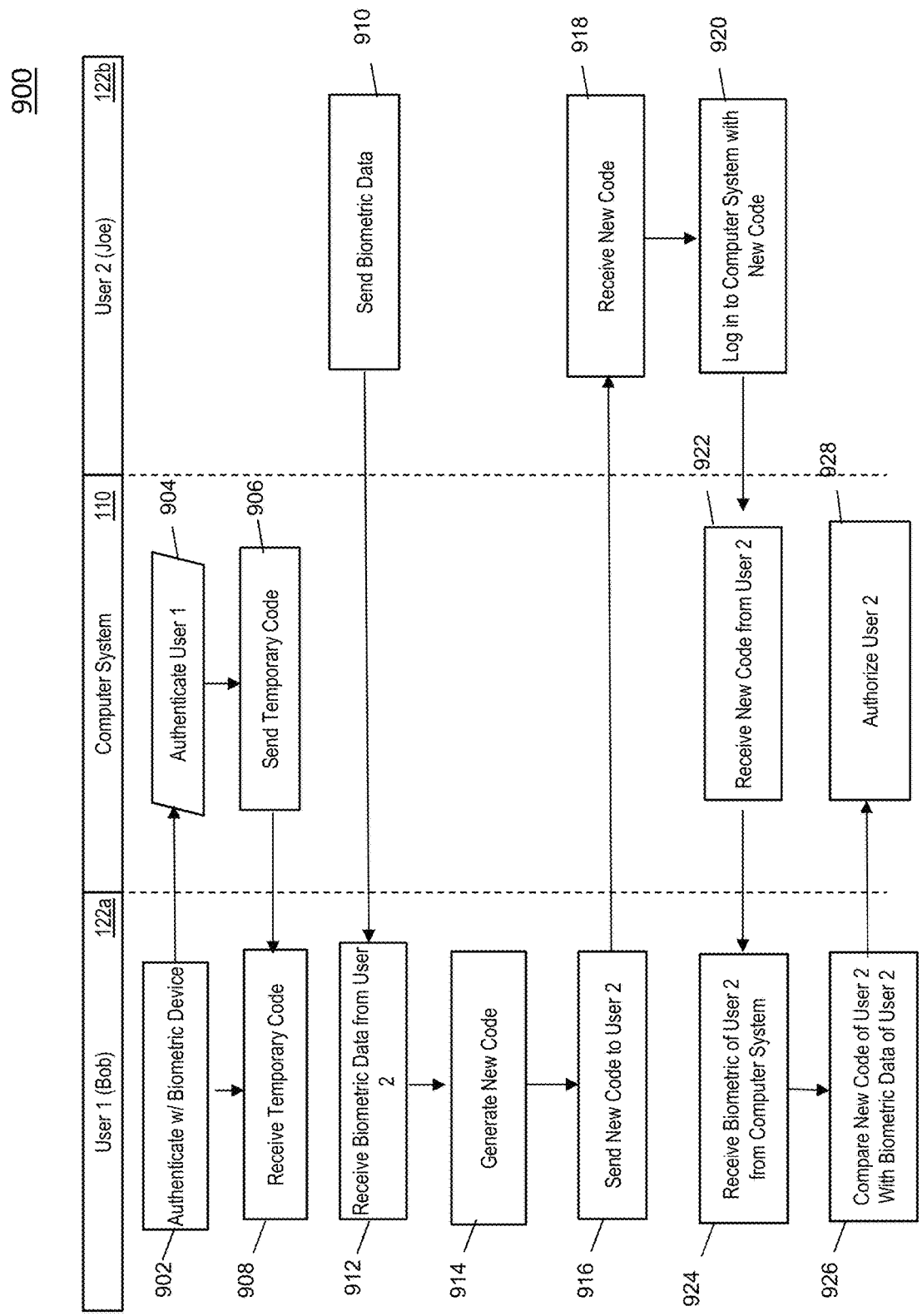
FIG. 9 is a flow chart illustrating the method for temporary use of biometric information to gain access to the computer system in accordance with the fourth embodiment.

FIG. 9 is a flow chart illustrating the method for temporary use of biometric information to gain access to the computer system in accordance with the fourth embodiment. As shown in FIG. 9, in step 902, the first user 122a (User 1) is authenticated on a first biometric device 120a and the biometric data of the first user 122a is sent to the computer system 110. In step 904, the computer system 110 confirms authenticates the first user 122a and his/her biometric data. In step 906, the computer system 110 generates and sends a temporary code to the biometric device 120a of the first user 122a, which is received by the biometric device 120a of the first user 122a in step 908. In step 910, the second user 122b (User 2) is authenticated on a second biometric device 120b and the biometric data of the second user 122b is sent to the first biometric device 120a of the first user 122. In step 912, the biometric data of the second user 122b is received on biometric device 120a of the first user 122a. In step 914, the biometric device 120a of the first user 122a sends the biometric data of the second user 122b to the computer system 110. In step 912, the computer system 110 receives the biometric data of the second user 112b. In step 914, the biometric device 120a of the first user generates a new code as disclosed herein and in step 916, the biometric device 120a of the first user 122a sends the new code to the biometric device 120b of the second user 122b, which is received in step 918 by the second biometric device 120b of the second user 122b. In step 920, the second user 122b using the second biometric device 120b logs into the computer system 110 using the new code received from the first biometric device 120a of the first user 122a. In step 922, the computer system 110 receives the new code from the second user 122b, and forwards the new code from the second users 122b to the biometric device 120a of the first user 122a. In step 924, the biometric data ABCDEF of the second user 122b is received on the biometric device 120a of the first user 122a and in step 926, the biometric data of the second user 122b is compared to the biometric data received from the second user 122b received in step 912 by the biometric device 120a of the first user 122a. If the biometric data received in step 924 matches the biometric data received in step 912 from the second user 122b, the biometric device 120a of the first user 122a will validate the second user 122b in step 928.

In accordance with an exemplary embodiment, in each of the examples shown in FIGS. 1-9, it is important to establish the following ideas: (1) there must be some correlation between the first user 122a (Joe) and the second user 122b (Bob), that is, before any authentication is approved, there must be a link to show that the first user 122a (Bob) knows about the biometric information of the second user 122b (Joe). In addition, the biometric data of the second user 122b (Joe) must always be validated in the approval to ensure that the second user 122b (Joe) is a valid person because it is possible that the biometric data, for example, 123456XXX (i.e., from the first user 122a and the code generated by the computer system 110) may be stolen. In addition, the actual biometric data of the first user 122a and the second user 122b can be encrypted to ensure that the first user 122a (Bob) and the second user 112b (Joe) are not able to obtain and/or know the actual biometrics of the first user 122a and/or the second user 122b (Joe) for privacy purposes. In accordance with an exemplary embodiment, the code (i.e., XXX) generated by the computer system 110 is preferably a temporary code, for example, a one-time use code, that can include, for example, a length of time in which access is allowed for the second user 122b to access the computer system 110. For example, the temporary code XXX may expire after 10 minutes to 2 hours, and once the second user 122b has been validated, the second user 122b may have access to the computer system for a set period of time, for example, 10 minutes to one week (seven days). In addition, in each of the exemplary embodiment, the second user 122b will only receive access to the computer system 110 if a temporary code XXX is issued. In the absence of the temporary code XXX being issued, the second user 122b will not be able to access the computer system 110.

Figure 10:
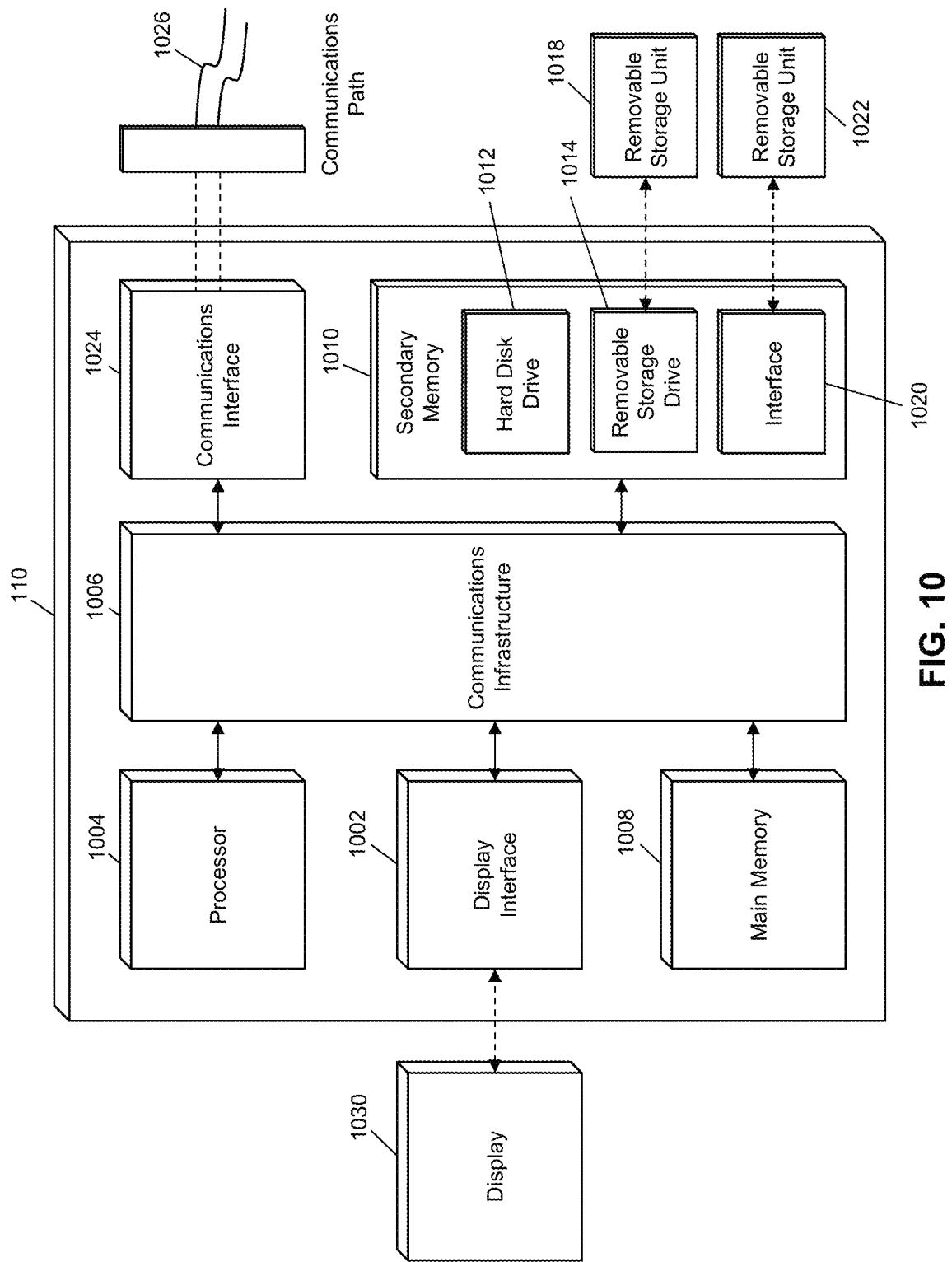
FIG. 10 is a block diagram illustrating a computer system architecture in accordance with exemplary embodiments.

FIG. 10 illustrates a computer system 110 in which embodiments of the present disclosure, or portions thereof, may be implemented as computer-readable code. For example, the system and methods of FIGS. 1-9 may be implemented in the computer system 110 using hardware, software, firmware, non-transitory computer readable media having instructions stored thereon, or a combination thereof and may be implemented in one or more computer systems or other processing systems. Hardware, software, or any combination thereof may embody modules and components used to implement the system and methods of FIGS. 2-9.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device (i.e., computer processor) as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1018, a removable storage unit 1022, and a hard disk installed in hard disk drive 1012.

Various embodiments of the present disclosure are described in terms of this example computer system 110. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device (or computer processor) 1004 may be a special purpose or a general purpose processor device specifically configured to act as a special purpose computer to perform the functions discussed herein. The processor device 1004 may be connected to a communications infrastructure 1006, such as a bus, message queue, network, multi-core message-passing scheme, etc. The network may be any network suitable for performing the functions as disclosed herein and may include a local area network (LAN), a wide area network (WAN), a wireless network (for example, WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 110 may also include a main memory 1008 (for example, random access memory, read-only memory, etc.), and may also include a secondary memory 1010. The secondary memory 1010 may include the hard disk drive 1012 and a removable storage drive 1014, such as a floppy disk drive, a magnetic tape drive, an optical disk drive, a flash memory, etc.

The removable storage drive 1014 may read from and/or write to the removable storage unit 1018 in a well-known manner. The removable storage unit 1018 may include a removable storage media that may be read by and written to by the removable storage drive 1014. For example, if the removable storage drive 1014 is a floppy disk drive or universal serial bus port, the removable storage unit 1018 may be a floppy disk or portable flash drive, respectively. In one embodiment, the removable storage unit 1018 may be non-transitory computer readable recording media.

In some embodiments, the secondary memory 1010 may include alternative means for allowing computer programs or other instructions to be loaded into the computer system 110, for example, the removable storage unit 1022 and an interface 1020. Examples of such means may include a program cartridge and cartridge interface (for example, as found in video game systems), a removable memory chip (for example, EEPROM, PROM, etc.) and associated socket, and other removable storage units 1022 and interfaces 1020 as will be apparent to persons having skill in the relevant art.

Data stored in the computer system 110 (for example, in the main memory 1008 and/or the secondary memory 1010) may be stored on any type of suitable computer readable media, such as optical storage (for example, a compact disc, digital versatile disc, Blu-ray disc, etc.) or magnetic tape storage (for example, a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 110 may also include a communications interface 1024. The communications interface 1024 may be configured to allow software and data to be transferred between the computer system 110 and external devices. Exemplary communications interfaces 1024 may include a modem, a network interface (for example, an Ethernet card), a communications port, a PCMCIA slot and card, etc. Software and data transferred via the communications interface 1024 may be in the form of signals, which may be electronic, electromagnetic, optical, or other signals as will be apparent to persons having skill in the relevant art. The signals may travel via a communications path 1026, which may be configured to carry the signals and may be implemented using wire, cable, fiber optics, a phone line, a cellular phone link, a radio frequency link, etc.

The computer system 110 may further include a display interface 1002. The display interface 1002 may be configured to allow data to be transferred between the computer system 110 and external display 1030. Exemplary display interfaces 1002 may include high-definition multimedia interface (HDMI), digital visual interface (DVI), video graphics array (VGA), etc. The display 1030 may be any suitable type of display for displaying data transmitted via the display interface 1002 of the computer system 110, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1008 and secondary memory 1010, which may be memory semiconductors (for example, DRAMs, etc.). These computer program products may be means for providing software to the computer system 110. Computer programs (for example, computer control logic) may be stored in the main memory 1008 and/or the secondary memory 1010. Computer programs may also be received via the communications interface 1024. Such computer programs, when executed, may enable computer system 110 to implement the present methods as discussed herein. In particular, the computer programs, when executed, may enable processor device 1004 to implement the system and methods illustrated by FIGS. 2-9, as discussed herein. Accordingly, such computer programs may represent controllers of the computer system 110. Where the present disclosure is implemented using software, the software may be stored in a computer program product and loaded into the computer system 110 using the removable storage drive 1014, interface 1020, and hard disk drive 1012, or communications interface 1024.

The processor device 1004 may comprise one or more modules or engines configured to perform the functions of the computer system 110. Each of the modules or engines may be implemented using hardware and, in some instances, may also utilize software, such as corresponding to program code and/or programs stored in the main memory 1008 or secondary memory 1010. In such instances, program code may be compiled by the processor device 1004 (for example, by a compiling module or engine) prior to execution by the hardware of the computer system 110. For example, the program code may be source code written in a programming language that is translated into a lower level language, such as assembly language or machine code, for execution by the processor device 1004 and/or any additional hardware components of the computer system 110. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 110 to perform the functions disclosed herein. It will be apparent to persons having skill in the relevant art that such processes result in the computer system 110 being a specially configured computer system 110 uniquely programmed to perform the functions discussed above.

In accordance with an exemplary embodiment, the computer system 110 can be a multi-function printer (MFP), an imaging forming apparatus, a printer or a printing device having, for example, a card reader or other system, which requires a user to be authorized to access print, fax, scan and/or copy functions. The multi-function printer (MFP), imaging forming apparatus can carry out various image processing under the control of a print controller or CPU, and sends the processed print image data to the print engine. The image processing section can also include a scanner section (scanner engine) for optically reading a document, such as an image recognition system. The scanner section receives the image from the scanner engine and converts the image into a digital image. The print engine forms an image on a print media (or recording sheet) based on the image data sent from the image processing section. The central processing unit (CPU) (or processor) and the memory can include a program for RIP processing (Raster Image Processing), which is a process for converting print data included in a print job into Raster Image data to be used in the printer or print engine.

In accordance with an exemplary embodiment, the operation of printer section commences when the printer section receives a page description via the network I/F in the form of a print job data stream and/or fax data stream. The page description may be any kind of page description languages (PDLs), such as PostScript® (PS), Printer Control Language (PCL), Portable Document Format (PDF), and/or XML Paper Specification (KPS). Examples of the multi-function printer (MFP), imaging forming apparatus, the printer or the printing device consistent with exemplary embodiments of the disclosure include, but are not limited to, a multi-function peripheral (MFP), a laser beam printer (LBP), an LED printer, a multi-function laser beam printer including copy function.

FIG. 11 is an illustration of a biometric device 120a, 120b in accordance with an exemplary embodiment. In accordance with an exemplary embodiment, the exemplary biometric device 120a, 120b is a security identification and authentication device, which uses automated methods of verifying or recognizing the identity of a living person based on a physiological or behavioral characteristic. The method of recognizing the user can include, for example, fingerprints, electrocardiogram (ECG or EKG) information, facial images, iris, and voice recognition. For example, in accordance with an exemplary embodiment, the biometric device is a wearable device, for example, a Nymi™ band, which detection of the user is based on the electrocardiogram (ECG) and its unique properties, i.e., electrical activity of the heartbeat of the wearer.

As shown in FIG. 11, the biometric device 120a, 120b can include a processor or central processing unit (CPU) 1110, and one or more memories 1120 for storing software programs and data, for example, an operating system. In accordance with an exemplary embodiment, the processor or CPU 1110 carries out the instructions of a computer program, which operates and/or controls at least a portion of the functionality of the biometric device 120a, 120b. The biometric device 120a, 120b can also include an input unit and/or display unit or graphical user interface (GUI) 1130, and a network interface (I/F) 1140, which is configured to connect the biometric device 120a, 120b to the server 1000 via, for example, a wire or wireless technology, for example, Bluetooth. A bus 1150 can connect the various components 1110, 1120, 1130, 1140, within the biometric device 120a, 120b.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present disclosure may be implemented such that its software part has been written onto a recording medium in advance and will be read as required in operation.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for temporarily gaining access to a system using biometric data of plural users, the method comprising:
receiving, on a computer processor, biometric data from a first biometric device of a first user;
generating, on the computer processor, a temporary code in response to receipt of the biometric data from the first biometric device of the first user;
sending, from the computer processor, the temporary code to the first biometric device of the first user;
receiving, on the first biometric device of the first user, biometric data from a second biometric device of a second user;
receiving, on the computer processor, the biometric data from the second biometric device of the second user from the first biometric device;
generating, on the first biometric device, an access code, the access code including at least the biometric data of the first user and the temporary code from the computer processor;
sending, by the first biometric device, the access code to the second biometric device of the second user;
receiving, on the computer processor, the access code with the biometric data of the second user from the second biometric device of the second user, the biometric data of the second user being a part of the access code or received in addition to the access code;
validating, by the computer processor, the access code with the biometric data of the second user received from the second biometric device of the second user; and
granting, by the computer processor, access to the second user to the system upon the validation of the access code with the biometric data of the second user received from the second biometric device of the second user.

2. The method according to claim 1, wherein the access code includes the biometric data of the first user, the temporary code from the computer processor, and the biometric data of the second user, the method further comprising:
receiving, by computer processor, the access code from the second biometric device of the second user;
validating, by the computer processor, the access code received from second biometric device of the second user;
granting, by the computer processor, the access to the second user to the system upon the validation of the access code.

3. The method according to claim 1, wherein the access code includes the biometric data of the first user and the temporary code from the computer processor, the method comprising:
receiving, by the computer processor, the access code and the biometric data from the second biometric device of the second user;
validating, by the computer processor, the access code and the biometric data from the second biometric device of the second user received from the second biometric device of the second user; and
granting, by the computer processor, the access to the second user to the system upon the validation of the access code and the biometric data from the second biometric device.

4. The method according to claim 1, wherein the access code includes the biometric data of the first user, the temporary code from the computer processor, and the biometric data of the second user, the method comprising:
receiving, by the computer processor, the access code from the second biometric device of the second user;
forwarding, by the computer processor, the biometric data of the second user received in the access code from the second biometric device of the second user to the first biometric device of first user;
validating, by the first biometric device of the first user, the biometric data of the second user used to generate the access code to the biometric data of the second user received in the access code from the second biometric device of the second user; and
sending, by the first biometric device of the first user, validation of the second user to access the system based upon the validating the biometric data of the second user used to generate the access code to the biometric data of the second user received in the access code from the second biometric device of the second user.

5. The method according to claim 1, wherein the first biometric device and the second biometric device are wearable biometric devices, the method comprising:
exchanging the biometric data of the first user, the temporary code from the computer processor, and the biometric data of the second user between the biometric device of the first user and the biometric device of the second user via a Bluetooth and/or a Near Field Communication.

6. The method according to claim 1, wherein the system is a computer, a card reader, a software application, a database, and/or a file.

7. The method according to claim 1, wherein one or more of the first biometric device and the second biometric device are wearable biometric devices configured to measures electrical activity of a heartbeat of the first user and the second user.

8. The method according to claim 1, further comprising:
encrypting the biometric data of the first user and the biometric data of the second user before exchanging the biometric data of the first user or the biometric data of the second user with the first biometric device, the second biometric device, and/or the computer processor.

9. The method according to claim 1, wherein the biometric data of the first user associated with the first biometric device has been previously been registered in the computer processor and the first user has been granted access to the system prior to granting access to the second user.

10. A system for temporarily gaining access to a computer system using biometric data of plural users, the system comprising:
a first biometric device of a first user;
a second biometric device of a second user;
a computer processor configured to:
receive biometric data from the first biometric device of the first user;
generate a temporary code on the computer processor in response to receipt of the biometric data from the first biometric device of the first user;
send the temporary code from the computer processor to the first biometric device of the first user; and
grant access to the second user to the computer system by validating an access code with the biometric data of the second user;
the first biometric device configured to:

receive biometric data from the second biometric device of the second user on the first biometric device of the first user;

send the biometric data from the second biometric device of the second user to the computer processor;

generate the access code, the access code including at least the biometric data of the first user and the temporary code from the computer processor; and send the access code to the biometric device of the second user; and the second biometric device configured to:

forward the access code with the biometric data of the second user to the computer processor for access to a computer system for the second user, the biometric data of the second user being a part of the access code or forwarded in addition to the access code.

11. The system according to claim 10, wherein the access code includes the biometric data of the first user, the temporary code from the computer processor, and the biometric data of the second user, the computer processor configured to:

receive the access code from the second biometric device of the second user;

validate the access code received from the second biometric device of the second user; and grant the access to the second user to the computer system upon the validation of the access code.

12. The system according to claim 10, wherein the access code includes the biometric data of the first user and the temporary code from the computer processor, the computer processor configured to:

receive the access code and the biometric data from the second biometric device of the second user;

validate the access code and the biometric data from the second biometric device of the second user received from the second biometric device of the second user; and grant the access to the second user to the computer system upon the validation of the access code and the biometric data from the second biometric device.

13. The system according to claim 10, wherein the access code includes the biometric data of the first user, the temporary code from the computer processor, and the biometric data of the second user, the computer processor configured to:

receive the access code from the second biometric device of the second user; and forward the biometric data of the second user received in the access code from the second biometric device of the second user to the first biometric device of first user;

the first biometric device configured to:

validate the biometric data of the second user used to generate the access code to the biometric data of the second user received in the access code from the second biometric device of the second user; and send validation of the second user to access the computer system based upon the validating the biometric data of the second user used to generate the access code to the biometric data of the second user received in the access code from the second biometric device of the second user.

14. A method for temporarily gaining access to a system using biometric data of plural users, the method comprising:

receiving, on a computer processor, biometric data from a first biometric device of a first user;

generating, by the computer processor, a temporary code on the computer processor in response to receipt of the biometric data from the first biometric device of the first user;

sending, by the computer processor, the temporary code to the first biometric device of the first user;

receiving, on the computer processor, biometric data of a second user from the first biometric device;

receiving, by the computer processor, an access code and the biometric data of the second user from a second biometric device of the second user, the access code including at least the biometric data of the first user and the temporary code generated by the computer processor and the biometric data of the second user being a part of the access code or received in addition to the access code;

validating, by the computer processor, the access code with the biometric data of the second user received from the second biometric device of the second user; and granting, by the computer processor, access to the second user to the system upon the validation of the access code with the biometric data of the second user received from the second biometric device of the second user.

15. The method according to claim 14, wherein the access code includes the biometric data of the first user, the temporary code from the computer processor, and the biometric data of the second user, the method further comprising:

receiving, by computer processor, the access code from the second biometric device of the second user;

validating, by the computer processor, the access code received from second biometric device of the second user; and granting, by the computer processor, the access to the second user to the system upon the validation of the access code.

16. The method according to claim 14, wherein the access code includes the biometric data of the first user and the temporary code from the computer processor, the method comprising:

receiving, by the computer processor, the access code and the biometric data from the second biometric device of the second user;

validating, by the computer processor, the access code and the biometric data from the second biometric device of the second user received from the second biometric device of the second user; and granting, by the computer processor, the access to the second user to the system upon the validation of the access code and the biometric data from the second biometric device.

17. The method according to claim 14, wherein the access code includes the biometric data of the first user, the temporary code from the computer processor, and the biometric data of the second user, the method comprising:

receiving, by the computer processor, the access code from the second biometric device of the second user;

forwarding, by the computer processor, the biometric data of the second user received in the access code from the second biometric device of the second user to the first biometric device of first user;

receiving, by the computer processor, validation of the second user to access the system based upon validation of the biometric data of the second user used to generate the access code to the biometric data of the second user received in the access code from the second biometric device of the second user by the first biometric device of the first user.

18. The method according to claim 14, wherein the first biometric device and the second biometric device are wearable biometric devices, the method comprising:
exchanging the biometric data of the first user, the temporary code from the computer processor, and the biometric data of the second user between the biometric device of the first user and the biometric device of the second user via a Bluetooth and/or a Near Field Communication.

19. The method according to claim 14, wherein the system is a computer, a card reader, a software application, a database, and/or a file.

20. The method according to claim 14, further comprising:
encrypting the biometric data of the first user and the biometric data of the second user before exchanging the biometric data of the first user or the biometric data of the second user with the first biometric device, the second biometric device, and/or the computer processor.

\* \* \* \* \*